United States Patent
Tuutijarvi

(10) Patent No.: US 6,553,065 B1
(45) Date of Patent: Apr. 22, 2003

(54) MOBILE STATION EMPLOYING CRC VERIFICATION USING DECODING RELIABILITY AND METHODS THEREFOR

(75) Inventor: Mika Tuutijarvi, Oulu (FI)

(73) Assignee: Nokia Corporation, Espo (FI)

( * ) Notice: Subject to any disclaimer, the term of this patent is extended or adjusted under 35 U.S.C. 154(b) by 0 days.

(21) Appl. No.: 09/243,936

(22) Filed: Feb. 4, 1999

(51) Int. Cl.[7] .............................................. H04B 17/00
(52) U.S. Cl. ...................... 375/224; 375/316; 375/346
(58) Field of Search .............................. 375/224, 262, 375/285, 316, 341, 346, 377; 370/328, 329, 331, 332, 333, 498, 522; 455/67.1, 67.3, 434, 553; 714/704, 794, 795, 796

(56) References Cited

U.S. PATENT DOCUMENTS

| | | | |
|---|---|---|---|
| 5,170,396 A | 12/1992 | Rivers et al. | 371/6 |
| 5,230,003 A * | 7/1993 | Dent et al. | 714/794 |
| 5,327,439 A | 7/1994 | Estola et al. | 371/43 |
| 5,396,653 A | 3/1995 | Kivari et al. | 455/88 |
| 5,420,889 A | 5/1995 | Juntti | 375/346 |
| 5,430,740 A | 7/1995 | Kivari et al. | 371/37.1 |
| 5,453,997 A | 9/1995 | Roney, IV | 371/141 |
| 5,770,927 A | 6/1998 | Abe | 375/340 |
| 5,784,392 A | 7/1998 | Czaja et al. | 371/43.1 |
| 5,796,757 A | 8/1998 | Czaja | 371/46 |
| 5,898,736 A * | 4/1999 | Saito et al. | 375/316 |
| 5,907,586 A * | 5/1999 | Katsuragawa et al. | 375/341 |
| 6,097,772 A * | 8/2000 | Johnson et al. | 375/346 |
| 6,295,302 B1 * | 9/2001 | Hellwig et al. | 370/522 |

FOREIGN PATENT DOCUMENTS

| | | | | |
|---|---|---|---|---|
| EP | 0 748 057 A1 | 12/1996 | | H03M/13/12 |
| GB | 2 305 088 A | 3/1997 | | H03M/13/00 |

OTHER PUBLICATIONS

IS– 136.2, Rev. A., Feb. 12, 1996, Section 2.7.3.1.1, pp. 219–224.

* cited by examiner

Primary Examiner—Stephen Chin
Assistant Examiner—Chieh M. Fan
(74) Attorney, Agent, or Firm—Harrington & Smith, LLP

(57) ABSTRACT

A method for operating a mobile station includes steps of (a) receiving a signal from a forward traffic channel and decoding the received signal using a first decoding technique to generate a first bit error rate (BER); (b) decoding the received signal using a second decoding technique to generate a second BER; (c) comparing the first BER to the second BER; and (d) declaring the received signal to be one of a FACCH message or user data depending on a result of the comparison. The method may include an additional step of verifying that the received signal contains a valid FACCH message type.

33 Claims, 6 Drawing Sheets

MOBILE STATION EMPLOYING CRC VERIFICATION USING DECODING RELIABILITY AND METHODS THEREFOR

FIELD OF THE INVENTION

This invention relates generally to telecommunications devices such as radiotelephones and, in particular, to radiotelephones or mobile stations that operate in accordance with a digital data transmission format and protocol.

BACKGROUND OF THE INVENTION

In one modern digital telecommunications system based on an air interface standard known as IS-136, a received data field in a digital data channel (DDCH) includes a transferred ordinary data block (DATA) or a control and supervisory message, known specifically as the fast associated control channel (FACCH). The IS-136 standard is one based on time division/multiple access (TDMA) and uses a slotted frame structure for both a forward channel (base station to mobile station) and a reverse channel (mobile station to base station).

Referring briefly to FIG. 3, it can be seen that a traffic channel can contain user information such as DATA, the FACCH, and a slow associated control channel (SACCH). As defined in IS-136, the traffic channel can contain at any given time only the user information or the FACCH, not both simultaneously. The DATA and FACCH use different encoding/decoding methods (and cyclic redundancy checks (CRCs)). The DATA may be data bits, such as facsimile data or computer network data, or may represent encoded speech data. The FACCH is defined as a channel used for signalling message exchange between the base station and the mobile station. Reference can be had to IS-136.2, Rev. A., Feb. 12, 1996, Section 2.7.3.1.1 (Fast Associated Control Channel (FACCH)), and to subsections 2.7.3.1.1.1 to 2.7.3.1.1.5 contained therein, for a description of the FACCH that is of most interest to this invention.

In general, the FACCH data is error protected by means of a rate 1/4 convolutional code, and 49 data bits in a FACCH word is appended with a 16-bit CRC to detect the presence of channel errors. Another intended purpose for the 16-bit CRC was originally stated to provide a mechanism to distinguish FACCH data from speech data. However, this latter purpose has been found to not be adequately fulfilled.

A general problem has arisen as to how to most accurately detect the data (and data type) in the received signal decoding process. Typically the data is decoded using one or more decoding methods, and then if a data integrity test passes (typically one using a CRC), the decoded bits become available for further processing. If the CRC check fails then another method may be tried for the decoding process, and another test of the CRC is made.

More particularly, it has been determined that an occasional received DATA block, with certain bit combinations, may erroneously pass the FACCH decoding process, and the FACCH CRC check as well. This failure mode is due to the rather limited length of the CRC field. In such a case the DATA may be lost, since it was erroneously detected to be a FACCH message from the base station.

In greater detail, a received block is typically decoded first as the FACCH. It has been found, however, that the FACCH CRC check will sometimes pass with some bit combinations that are found in ordinary data blocks (e.g., encoded speech data). In this case the data block is detected (erroneously) to be a FACCH message, and the ordinary data can be lost completely. The presumed FACCH message is then further processed and subsequently detected to be invalid (erroneous type). Also very troublesome is the case where the assumed FACCH message (actually data) corresponds to one of the plurality of valid FACCH messages, thereby introducing a possibility that the mobile station may operate in an erroneous manner. In any event, the intended ordinary DATA block has been lost.

There may exist an ability to retransmit the DATA (e.g. if no acknowledgement of receipt by the mobile station is detected at the base station), especially in some circumstances where the DATA is regarded as vital. However, this could result in the generation of an endless loop if the DATA is again erroneously detected as a FACCH message in the mobile station. The final result could be dropping a DATA call.

The same failure mechanism can be found on the base station side as well, and a DATA call can be dropped when the DATA is being transferred to the base station from the mobile station.

Similar failure mechanisms have been observed with VSELP-coded speech, where a received FACCH message was erroneously detected as speech due to the CRC check being passed.

To summarize, and by example, in an IS-136 specification-based mobile station the FACCH data is well protected against channel induced errors (1/4 rate convolution coding), and the decoding process can correct several erroneous bits in the data field. Typically, but not necessarily, the mobile station first attempts to decode the received signal as a FACCH message. However, if the decoded data block is not a FACCH message (i.e., it is ordinary DATA) the FACCH decoding process attempts to correct several (typically 30–65) bits in the data field. In most cases the CRC check will fail. However, some random bit sequences in decoded (ordinary) DATA may also produce a CRC check that passes. The decoding process then erroneously assumes that the received bits represent a FACCH message that has a high bit error rate (poor RF signal), and the DATA is lost. The presumed FACCH message will then typically be subsequently determined to be invalid, although in some cases the received bit sequence may decode to a valid FACCH message, resulting in a possibility of erroneous mobile station operation.

OBJECTS AND ADVANTAGES OF THE INVENTION

It is thus a first object and advantage of this invention to provide an improved method for receiving information from a traffic channel in either or both of a mobile station and a base station of a radio telecommunications system.

It is a further object and advantage of this invention to provide a method for distinguishing received control messages from received data, such as computer data or encoded speech data.

It is another object and advantage of this invention to provide a method for distinguishing received FACCH messages from received user DATA, such as computer data or encoded speech data.

SUMMARY OF THE INVENTION

The foregoing and other problems are overcome and the objects and advantages are realized by methods and apparatus in accordance with embodiments of this invention.

In accordance with the teachings of this invention a decoding process is carried out with all possible decoding methods. If the CRC check passes with more than one decoding method, then a further study of the decoding process is made to determine which one resulted in a correct CRC check.

In accordance with an embodiment of this invention the receiver circuitry typically first decodes a received signal as a FACCH message and obtains a first BER, and then also attempts to decode the same input signal (received bits) as ordinary or user DATA (DATA in a digital data channel and speech in a digital speech channel). In the latter case the decoding process and the CRC check will also pass, because the received data was actually an ordinary DATA block. The decoding process then corrects, typically, zero or only a few erroneous bits (induced by a poor radio channel) and it finds that a second BER is significantly lower than the first BER that was obtained when the received signal was decoded assuming a FACCH message. The data type (FACCH or ordinary (user) DATA) is then selected based on the first BER obtained when the received signal was decoded as a FACCH message and the second BER obtained when the received signal was decoded as ordinary DATA. That is, it is assumed that the lowest BER indicates the true data type of the received signal.

More particularly, in an embodiment of this invention a method is disclosed for operating a mobile station of a type that receives a digital traffic channel, such as a time division, multiple access (TDMA), IS-136 compliant mobile station. The method includes steps of (a) receiving a signal from a forward traffic channel and decoding the received signal using a first predetermined decoding technique to generate a first bit error rate (BER); (b) decoding the received signal using a second predetermined decoding technique to generate a second BER; (c) comparing the first BER to the second BER; and (d) declaring the received signal to be one of a FACCH message or user data depending on a result of the comparison. The step of declaring may include a preliminary step, for a case where the step of comparing indicates that the received signal is a FACCH message, of first verifying that the received signal contains a valid FACCH message type.

In other embodiments of this invention, useful in either one or both of a mobile station and a base station, a combination of signal quality indications, such as BER and CRC validity indicators, are used to detect a type of data that is received, and to declare that the received data is one of a control and supervision related message (such as the FACCH), or is user DATA or encoded speech information.

In general, the teachings of this invention apply to both DATA calls and to voice calls.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
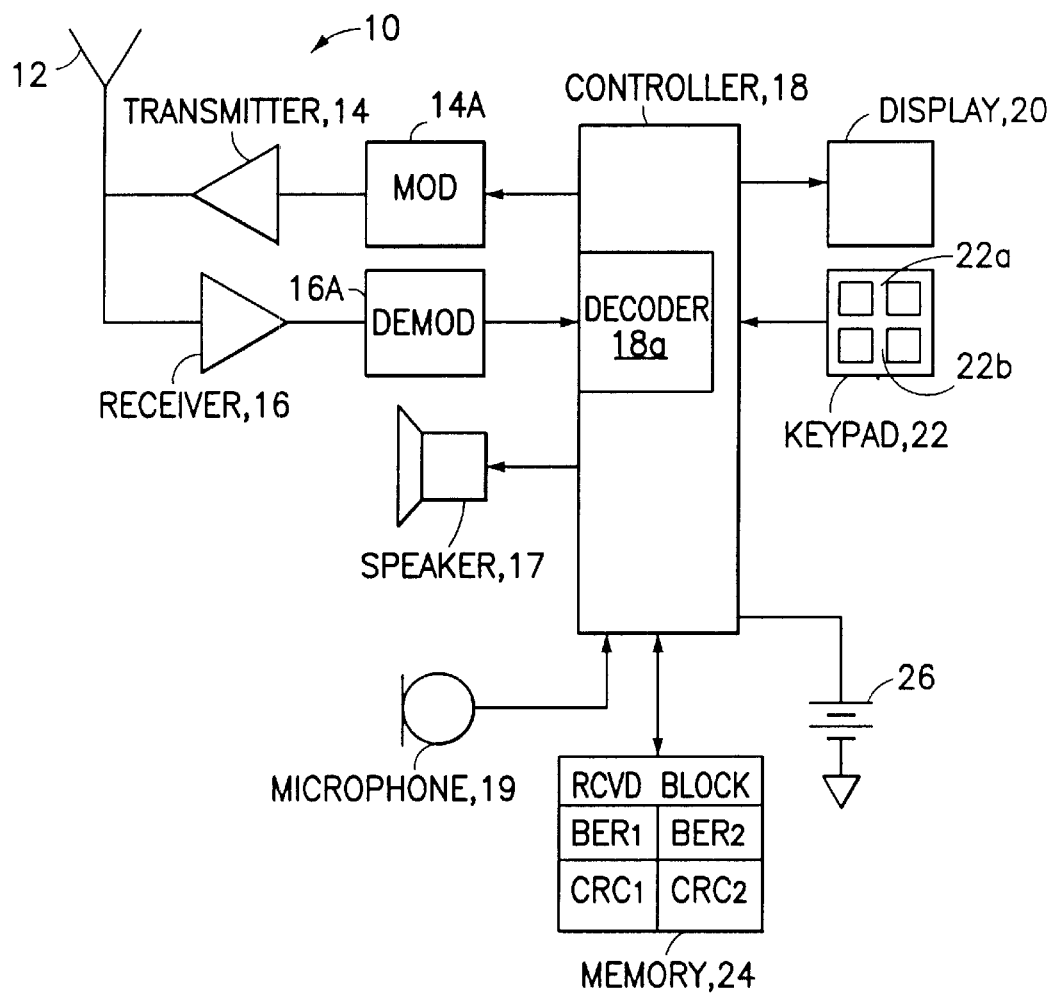
FIG. 1 is a block diagram of a mobile station that is constructed and operated in accordance with this invention.
Figure 2:
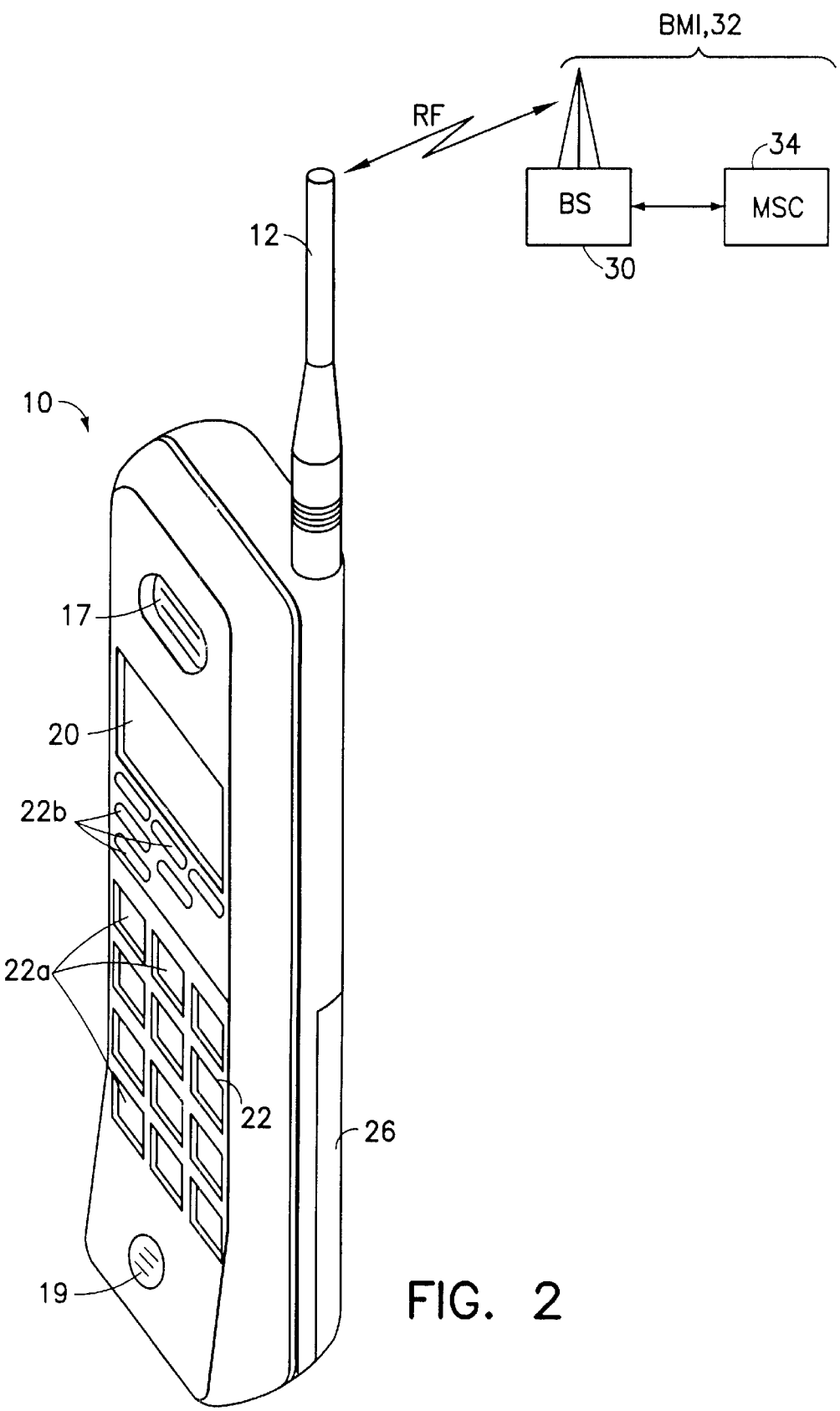
FIG. 2 is an elevational view of the mobile station shown in FIG. 1, and which further illustrates a cellular communication system to which the mobile station is bidirectionally coupled through wireless RF links.
Figure 3:
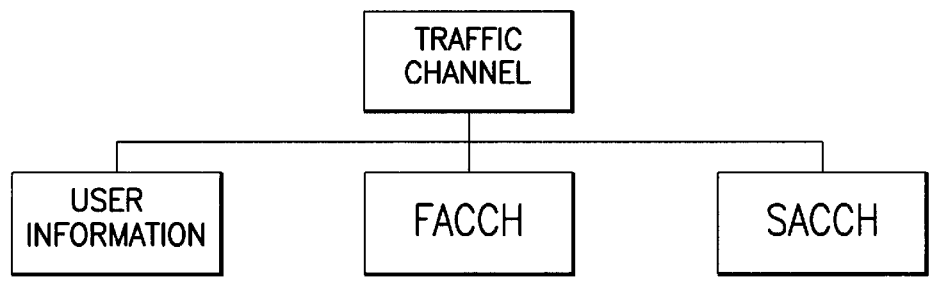
FIG. 3 is a very high level depiction of a conventional traffic channel organization.

Reference is first made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising a Base Station/Mobile Switching Center/Interworking function (BMI) 32 that includes a mobile switching center (MSC) 34. The MSC 34 provides a connection to landline trunks when the mobile station 10 is involved in a call, which may be a voice call or a DATA call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data.

The air interface standard is assumed for this invention to use a digital channel (such as is found in IS-136) that is capable of conveying a messaging channel, such as the FACCH, as well as "ordinary" or "user" data, which is assumed to include DATA such as facsimile or computer data (e.g., Internet data packets having a TCP/IP format), or speech data obtained from a suitable speech coder. However, the teachings of this invention are not intended to be limited only for use with an IS-136 compatible mobile station, or for use only in TDMA type systems. In fact, the teachings of this invention may be applied as well to at least some CDMA type systems, as well as to various embodiments of other types of TDMA systems.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities. For the purposes of this invention the controller 18 is assumed to contain or implement at least one decoder 18a for decoding a received block of bits. One decoder 18a could be used to decode the signal using two or more selected decoding techniques, as described in detail below, or multiple separate decoders could be used for this purpose.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. The memory 24 may be an external memory device as shown, or may be integrated within the controller 18. For example, the memory 24 stores the values of various cellular system parameters and the number assignment module (NAM). An operating program for controlling the operation of controller 18 is also stored in the memory 24 (typically in a ROM device). In accordance with an aspect of this invention, the memory 24 is used to store a received block of data from the forward traffic channel, and to also store first and second BERs, as described below, as well as first and second CRCs, also as described below.

In a first aspect of this invention the foregoing problems are overcome by decoding a received signal as a FACCH message, and by determining if the received data represents a valid control message. If the received data does not decode as a valid FACCH message, then it can be assumed that an ordinary data block has been received. The processing of the ordinary data block can thereafter proceed according to higher levels of data handling.

However, there will still remain a possibility that the block can be erroneously detected to be a valid FACCH message, even in the case where the block actually contained an ordinary data block. Therefore an invalid behavior may be generated in the mobile station 10 (such as an erroneous or inappropriate operation of the controller 18) and/or a data block will be lost, causing a possible error loop in the data handling portion of the data transfer.

In accordance with a presently more preferred embodiment of this invention, the mobile station 10 decodes the received data block as both a FACCH message and as ordinary DATA. In some cases the result of the decoding process is such that the CRC check will pass for both decoding methods.

In such a case it is most likely that the erroneous decoding procedure has modified several bits in the received block (attempted error correction) while the correct decoding procedure has modified none or only a few bits in the slot to compensate for normal channel induced errors.

The received signal bit error rate (BER) can be approximated accordingly as a function of the number of bits the decoding procedure corrected. The method can then determine what type of data the received block actually contained (FACCH or user DATA) by selecting the decoding method which provides the lower BER with the received signal (block of bits).

One may also detect the correctness of the FACCH message as well, in case the FACCH decoding procedure resulted in a lower BER (fewer corrected bits).

Figure 4:
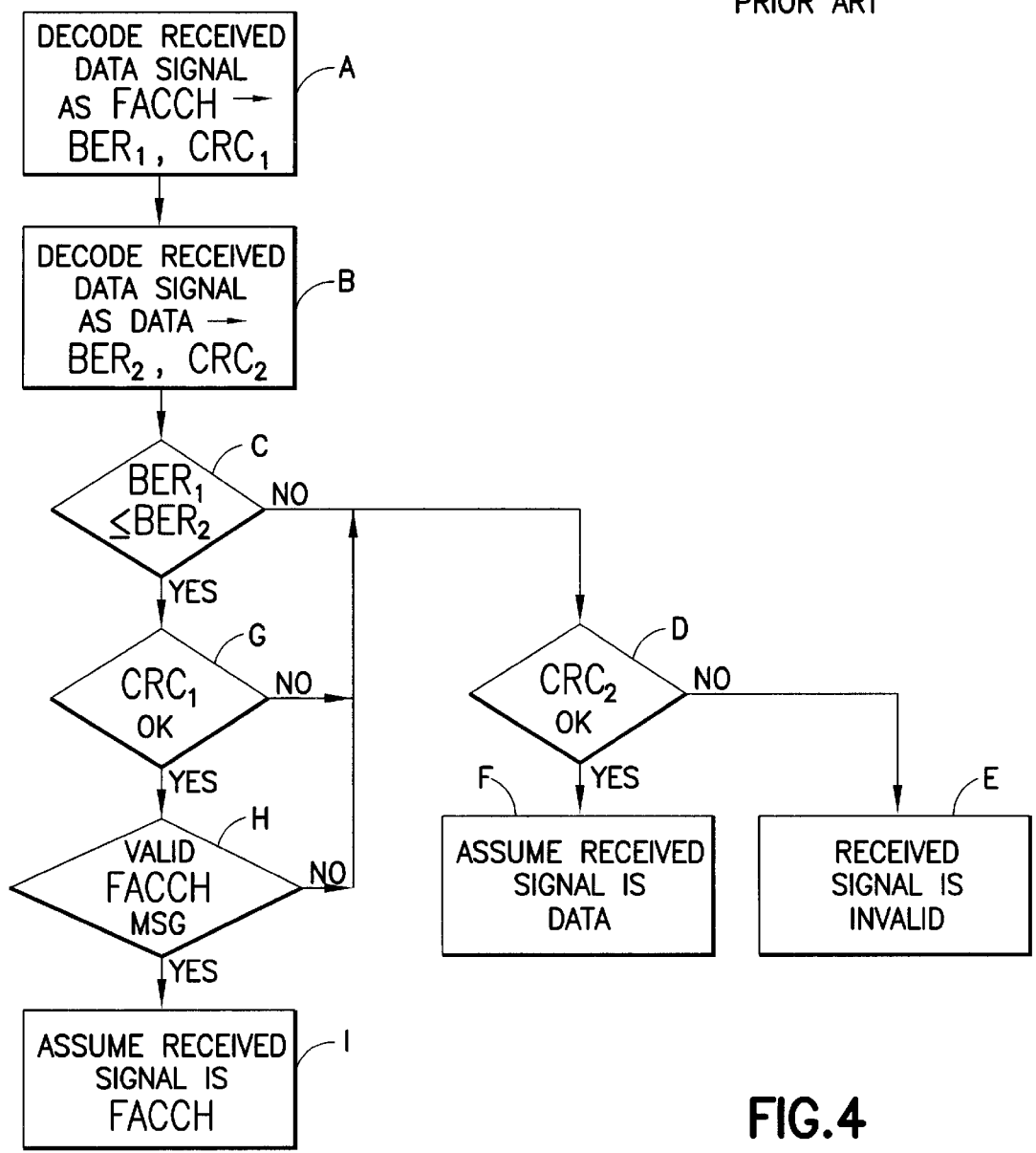
FIG. 4 is a logic flow diagram of a method in accordance with a first embodiment of the teachings of this invention.

In greater detail, and referring now to FIG. 4 for a first embodiment of this invention, at Block A the mobile station 10 receives and stores in the memory 24 a block of data from the forward traffic channel, and executes a predetermined decoding procedure to first decode the received data signal (block of bits) as a FACCH message (using, for an IS-136 example, the procedures outlined in Section 2.7.3.1.1). During the decoding of the data block, using the rate 1/4 convolutional decoding procedure, the specified error checking and correction is accomplished, and a first received signal quality indication, such as a BER ($BER_1$), is obtained and stored in the memory 24 (see FIG. 1), as is another received signal quality indication, such as a CRC ($CRC_1$).

At Block B the stored data block is again decoded, but this time using the decoding procedure specified for user DATA/speech. The end result is the generation of a second received signal quality indication, such as the BER ($BER_2$), which may be stored as well in the memory 24 or used immediately in the execution of the following Block C. A second CRC ($CRC_2$) is obtained and stored in the memory 24 as well.

At Block C the controller 18 compares $BER_1$ and $BER_2$. If $BER_1$ is not less than (or equal to) $BER_2$, then control passes to Block D where a check is made to determine if $CRC_2$ passes. If it does, then it assumed at Block E that the received signal is user DATA, and further processing of the user DATA is performed as required. If the CRC check at Block D indicates that the CRC does not pass, then the received signal is assumed to be invalid or too corrupted to use.

That is, if the method reaches Block F the test at Block C found that the first BER, i.e., the one obtained when the received signal was decoded assuming a FACCH message, indicated a higher number of bit errors that the number obtained when the received signal was decoded assuming a DATA/speech signal, yet the CRC obtained when the signal was decoded as DATA/speech did not match the CRC value that forms a part of the received data signal.

When at Block C the controller 18 compares $BER_1$ and $BER_2$ and finds that $BER_1$ is less than (or equal to) $BER_2$, then control instead passes to Block G where a check is made to determine if $CRC_1$ passes (i.e., does the CRC obtained when the signal was decoded as FACCH match the CRC value that forms a part of the received data signal?) If it does, then control passes to (optional) Block H where a step is performed of determining if the received signal contains a valid FACCH message type. If not, then control passes to Block D, as it does as well if the CRC test at Block G fails. At Block D a check is made to see if the $CRC_2$ is good, as described previously. If the test at (optional) Block H passes (or the test at Block G passes if Block H is not used), then control passes to Block I where it is assumed that the received signal is a FACCH message, and subsequent processing of the received signal as a FACCH message is performed.

The invention has been described above in the context of using the BER as the signal quality indicator. However, the teaching if this invention is not limited for use only with the BER, as the symbol error rate (SER) could be used as well, preferably in combination with the BER. Whatever quality measure is used, it is desirable that it be indicative of the number of erroneous, possibly corrected, bits that occur in the received block of bits during the execution of the selected decoding process.

Figure 5:
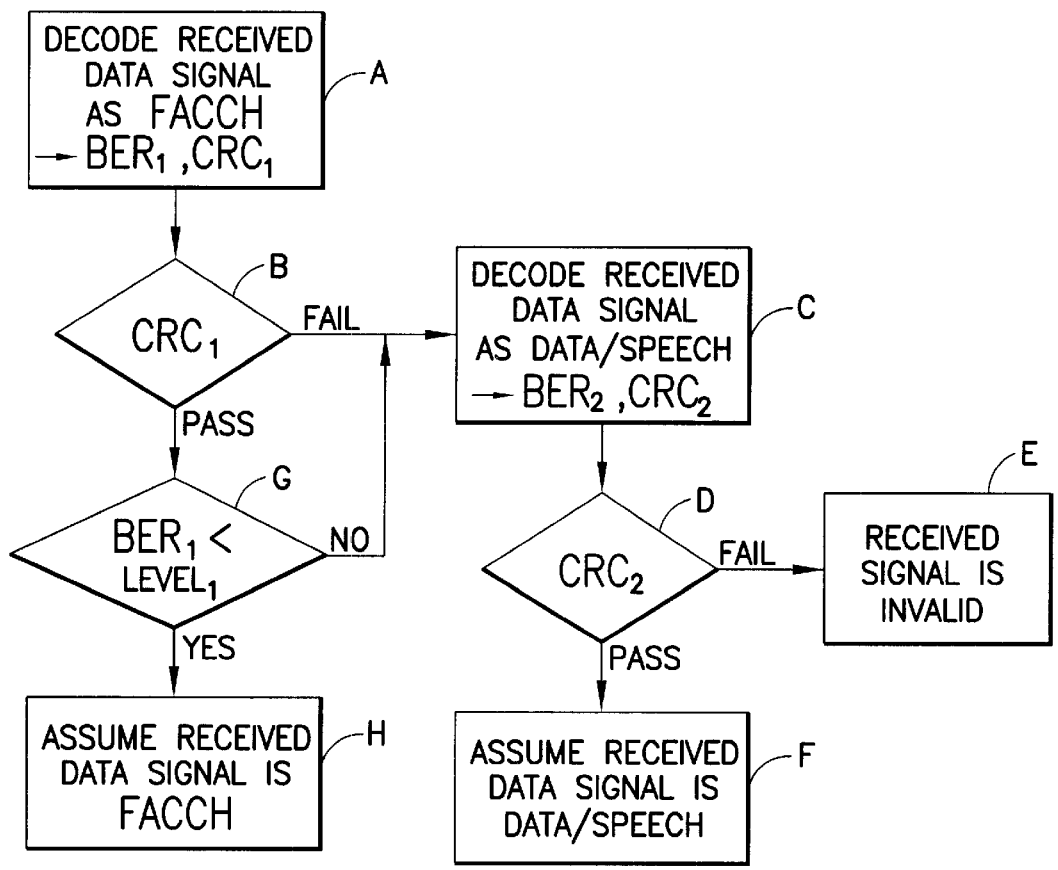
FIG. 5 is a logic flow diagram of a method in accordance with a second embodiment of the teachings of this invention.

Referring to FIG. 5, at Block A the received data signal (i.e., block of bits) is first decoded as FACCH, and the $BER_1$ is derived and stored in the memory 24. At Block B the CRC validity indicator which resulted from the decoding step of Block A is checked to determine if it meets a pass/fail criterion. If the CRC validity indicator indicates a fail condition, control passes to Block C where the stored data block is again decoded, but this time using the decoding procedure specified for user DATA/speech. Although not specifically required later in the method, one result of this decoding step is the generation of the $BER_2$, which may be stored in the memory 24. At Block D the CRC validity indicator which resulted from the decoding step of Block C is checked to determine if it meets the pass/fail criterion. If the CRC validity indicator indicates a fail condition, control passes to Block E where the data block is declared to be invalid and may be typically be erased or overwritten. If the CRC validity indicator indicates a pass condition at Block D, control instead passes to Block F where the decoded data block is declared to be DATA/speech to further processing routines.

Returning to Block B, if the CRC validity indicator that resulted from the decoding step of Block A instead indicates a pass condition, control passes to Block G to compare the BER to some threshold level (LEVEL$_1$). If BER$_1$ is less than the threshold, then control passes to Block H where the decoded data block is declared to be a FACCH message to further processing routines. If BER$_1$ is not less than the threshold, then control passes instead to Block C where, as described above, the stored data block is again decoded, but this time using the decoding procedure specified for user DATA/speech.

Figure 6:
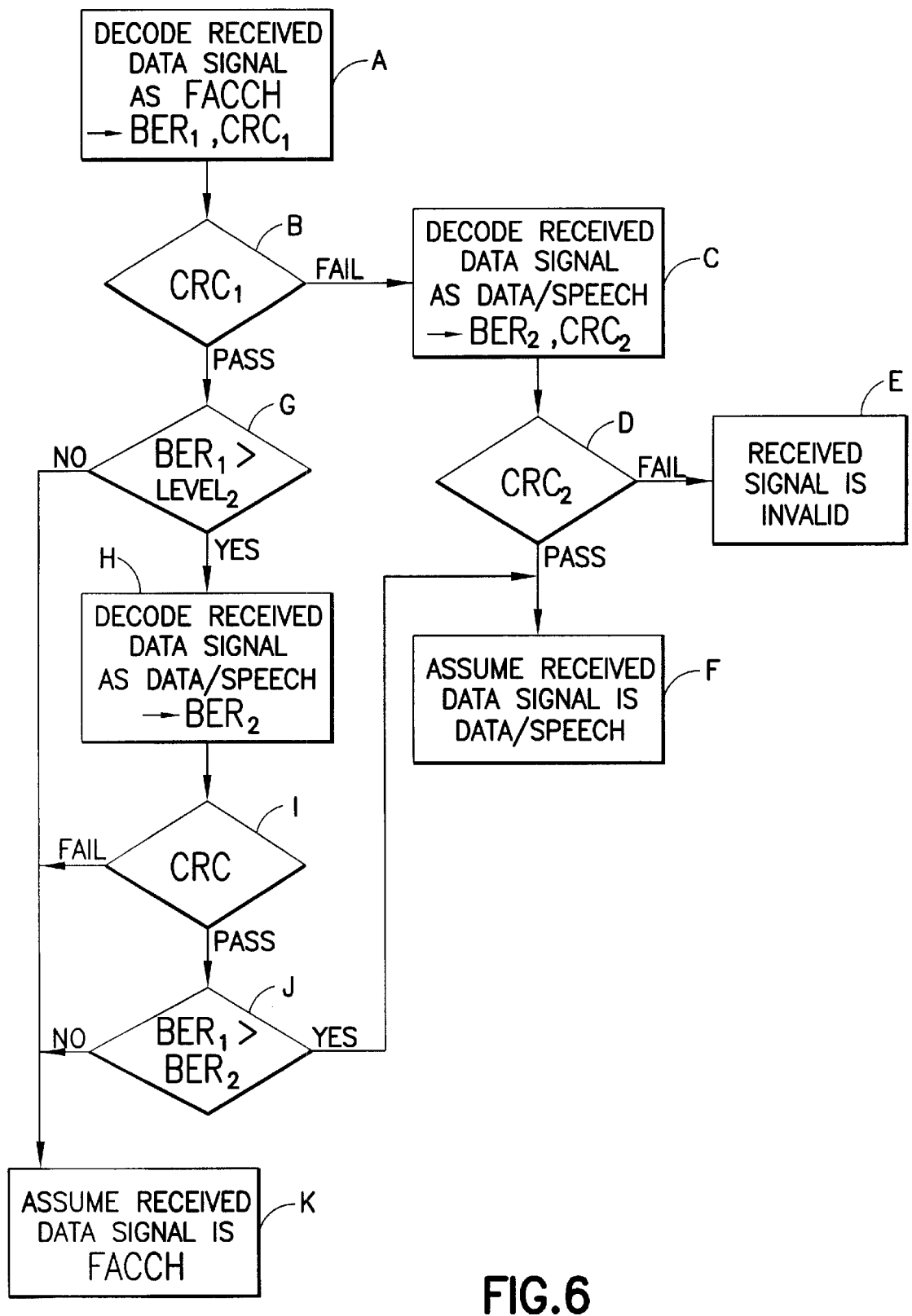
FIG. 6 is a logic flow diagram of a method in accordance with a third embodiment of the teachings of this invention.

Reference is now made to the embodiment shown in FIG. 6. Blocks A, B, C, D, E and F operate as described above in reference to FIG. 5. At Block G the BER$_1$ is compared to a threshold level (referred to as LEVEL$_2$ to distinguish it from the threshold described in FIG. 5). LEVEL$_2$ is preferably defined as zero or some small value. If BER$_1$ is greater than the threshold, then control passes to Block H where the stored data block is again decoded using the decoding procedure specified for user DATA/speech. The end result is the generation of BER$_2$, which is stored in the memory 24. At Block I the CRC validity indicator which resulted from the decoding step of Block H is checked to determine if it meets a pass/fail criterion. If the CRC validity indicator indicates a pass condition, control passes to Block J to make a comparison as to whether BER$_2$ is greater than BER$_1$. If it is, control passes to Block F where the decoded data block is declared to be DATA/speech to further processing routines. If at Block G BER$_1$ is found to not be greater than the LEVEL$_2$ threshold (that is, zero or only a few bit errors are detected during the FACCH decoding), or if the CRC validity indicator fails the test at Block I, or if at Block J it is found that BER$_2$ is not greater than BER$_1$, then control passes to Block K where the decoded data block is declared to be a FACCH message to further processing routines.

Figure 7:
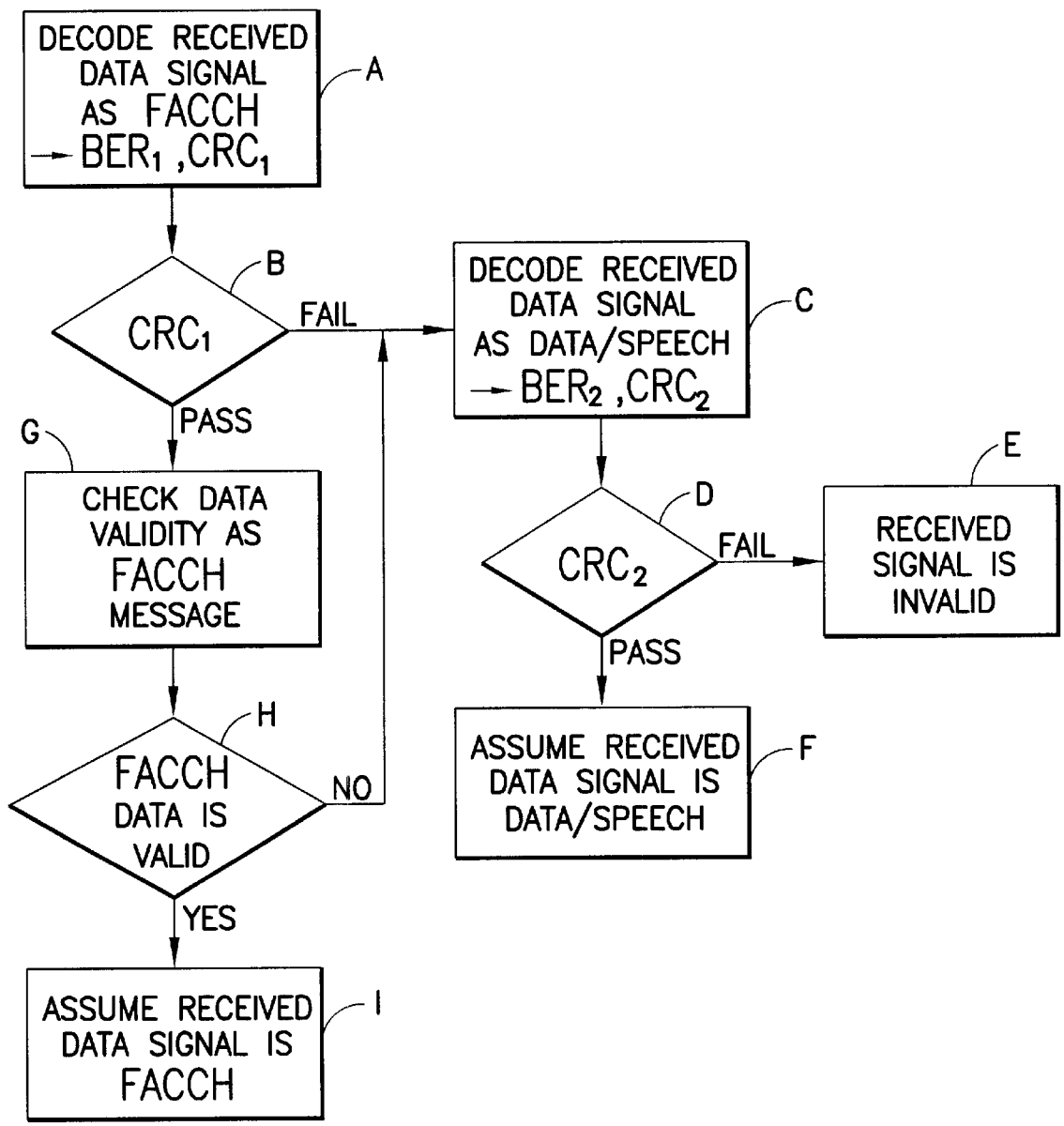
FIG. 7 is a logic flow diagram of a method in accordance with a fourth embodiment of the teachings of this invention.

Reference is now made to the embodiment shown in FIG. 7. It can be noted at the outset that this embodiment does not require the use of the BER indications, but relies instead only on CRC validity indicators (i.e., does the computed CRC from the decoded block of bits equal the expected CRC value found in the CRC field of the received signal?).

It is also noted that in the speech channel it is preferred to decode the received signal (e.g., using class-1 bits only) as speech (or FACCH) using the convolutional polynomial defined in the applicable specification (e.g., IS-136). In the (circuit switched) DATA channel it is preferred to decode the signal as DATA. Both use the same convolutional polynomial (in the Viterbi decoder), but a different number of bits are (de)coded and the CRC is calculated over different (number of) bits. Also, the CRC field length (i.e., number of CRC bits) is different, so the CRC polynomial is also different for speech and DATA. For example, speech has a 7-bit CRC and DATA has a 16 or 24-bit CRC field. VSELP and EFR speech coding methods also have a different number of coded bits.

Returning again to FIG. 7, at Block A the received data signal (i.e., block of bits) is first decoded as FACCH. At Block B the CRC validity indicator which resulted from the decoding step of Block A is checked to determine if it meets the pass/fail criterion. If the CRC validity indicator indicates a fail condition, control passes to Block C where the stored data block is once again decoded, but this time using the decoding procedure specified for user DATA/speech. At Block D the CRC validity indicator which resulted from the decoding step of Block C is checked to determine if it meets the pass/fail criterion. If the CRC validity indicator indicates a fail condition, control passes to Block E where the data block is declared to be invalid and is typically erased or overwritten. If the CRC validity indicator indicates a pass condition at Block D, control instead passes to Block F where the decoded data block is declared to be DATA/speech to further processing routines. These steps are very similar to those disclosed in FIG. 5, with the exception of the sole use of the CRC indicators, and not the BER values.

If the CRC test passes at Block B, then control instead passes to Block G where the validity of the decoded data as a FACCH message is checked (i.e., does the decoded data represent a valid FACCH message type?) If at Block H it is found that the FACCH data is valid, then control passes to Block I where the decoded data block is declared to be a FACCH message to further processing routines. If it is instead found at Block H that the FACCH data is not valid, then control passes to Block C, and processing continues as described above.

Although described in the context of preferred embodiments, it should be realized that a number of modifications to these teachings may occur to one skilled in the art. By example, certain blocks in the flow charts could be executed in other than the order shown, and other steps could be inserted as well, while still achieving the same desired result. For example, blocks A and B of FIG. 4 could be reversed, as could Block G and the (optional Block H), and/or the operation of Block F could result in the generation of a no received data flag with a data retransmission request, if available. As was mentioned previously, the teachings of this invention are also not limited to receiving the forward channel in a TDMA format, as a CDMA or some other format could be used as well. It should also be realized that the teachings of this invention can be extended to the use of three or more decoding schemes and the generation and comparison of three or more received signal quality indicators, such as BERs, in a case where a transmitted signal could contain three or more different types of information to be accurately identified and distinguished for further processing.

It should further be noted that the BER gives the desired information since the number of bit errors in the received data is of most interest, while an averaged value of a number of errors over multiple received slots is of little or no interest. As such, the expression 'BER' has been used for convenience to describe the amount of erroneous bits in the received signal (the last received slot), and need not actually indicate a "rate" of errors per se. In accordance with the teachings of this invention the erroneous bits (high BER) are induced mainly by the use of the (wrong) decoding method (e.g., attempting to decode a FACCH message using the decoding technique intended for DATA/speech.) In this context the value of a BER or similar signal quality indicator that is found to be less than some threshold value would be considered to be "better" than another BER or signal quality indicator that is found to be greater then the threshold value, while conversely the value of a BER or similar signal quality indicator that is found to be greater than some threshold value would be considered to be "worse" than another BER or signal quality indicator that is found to be less then the threshold value.

It should also be remembered that the teachings of this invention can be used in the mobile part of the wireless communication network, for example in a mobile station such as a cellular telephone, a personal communicator, or a wireless modem; or it may be used in the fixed part of the wireless communication network, such as in a base station or cell site receiver (which are considered to be wireless devices for the purposes of this invention.) The teachings of this invention can thus be used as well in both the mobile and fixed parts of the communication network.

In view of foregoing comments, and also in view of the several possible embodiments of the invention that were described above, those skilled in the art should appreciate that while the invention has been particularly shown and described with respect to these preferred embodiments, various changes in form and detail may be made to the teachings of this invention without departing from the scope and spirit of the invention.

What is claimed is:

1. A method for operating a wireless device, comprising steps of:
   (A) receiving a signal and decoding the received signal using a first predetermined decoding technique to generate a first received signal quality indication and a second received signal quality indication;
   (B) determining if the second received signal quality indication indicates one of a pass/fail condition;
   (C) if a pass condition is indicated, comparing the first received signal quality indication to a threshold value; and
   (D) if the first received signal quality indication is better than the threshold value, declaring the received signal to be a first type of received signal; else
   (E) if a pass condition is not indicated at Step C, or if the first received signal quality indication is found to not be better than the threshold value at Step D, decoding the received signal using a second predetermined decoding technique to generate a third received signal quality indication;
   (F) determining if the third received signal quality indication indicates one of a pass/fail condition;
   (G) if a pass condition is indicated at Step F, declaring the received signal to be a second type of received signal; else
   (H) if a fail condition is indicated at Step F, declaring the received signal to be invalid.

2. A method as in claim 1, wherein the first received signal quality indication is a Bit Error Rate (BER), and wherein the second and third received signal quality indications are each a Cyclic Redundancy Check (CRC) indicator.

3. A method as in claim 1, wherein the first type of received signal is a control and supervision message type, and wherein the second type of received signal conveys data generated by a user or intended for a user.

4. A method as in claim 1, wherein the first type of received signal is a Fast Associated Control Channel (FACCH) type, and wherein the second type of received signal is one of a DATA type or an encoded speech type.

5. A method as in claim 1, wherein the device is one of a mobile station or a base station.

6. A method for operating a wireless device, comprising steps of:
   (A) receiving a signal and decoding the received signal using a first predetermined decoding technique to generate a first received signal quality indication and a second received signal quality indication;
   (B) determining if the second received signal quality indication indicates one of a pass/fail condition;
   (C) if a pass condition is indicated, comparing the first received signal quality indication to a threshold value; and
   (D) if the first received signal quality indication is worse than the threshold value, decoding the received signal using a second predetermined decoding technique to generate a third received signal quality indication and a fourth received signal quality indication;
   (E) determining if the fourth received signal quality indication indicates one of a pass/fail condition;
       if a pass condition is indicated, comparing the first received signal quality indication to the third received signal quality indication; and
   (F) if the first received signal quality indication is not worse than the third received signal quality indication, or if the first received signal quality indication is not worse than the threshold value in Step D, or if the fourth received signal quality indication indicates a fail condition in Step E, then declaring the received signal to be a first type of received signal;
   (G) if a pass condition is not indicated at Step B, decoding the received signal using the second predetermined decoding technique to generate the third received signal quality indication and the fourth received signal quality indication;
   (H) determining if the fourth received signal quality indication indicates one of the pass/fail condition;
   (I) if a pass condition is indicated at Step H, or if the first received signal quality indication is determined to be worse than the third received signal quality indication at Step E, declaring the received signal to be a second type of received signal; else
   (J) if a fail condition is indicated at Step H, declaring the received signal to be invalid.

7. A method as in claim 6, wherein the first and third received signal quality indications are each a Bit Error Rate (BER), and wherein the second and fourth received signal quality indications are each a Cyclic Redundancy Check (CRC) indicator.

8. A method as in claim 6, wherein the first type of received signal is a control and supervision message type, and wherein the second type of received signal conveys data generated by a user or intended for a user.

9. A method as in claim 6, wherein the first type of received signal is a Fast Associated Control Channel (FACCH) type, and wherein the second type of received signal is one of a DATA type or an encoded speech type.

10. A method as in claim 6, wherein the device is one of a mobile station or a base station.

11. A method for operating a wireless device, comprising steps of:
    (A) receiving a signal and decoding the received signal using a first predetermined decoding technique to generate decoded data and a first received signal quality indication;
    (B) determining if the first received signal quality indication indicates one of a pass/fail condition;
    (C) if a pass condition is indicated, checking the decoded data to determine if it contains a valid data type;
    (D) if yes, declaring the received signal to be a first type of received signal; else
    (E) if the first received signal quality indication indicates a fail condition at Step B, or if the checking of the decoded data does not find that it contains a valid data type, decoding the received signal using a second predetermined decoding technique to generate a second received signal quality indication;

(F) determining if the second received signal quality indication indicates one of a pass/fail condition;

(G) if a pass condition is indicated, declaring the received signal to be a second type of received signal; else (H) if a fail condition is indicated, declaring the received signal to be invalid.

12. A method as in claim 11, wherein the first and the second received signal quality indications are each a Cyclic Redundancy Check (CRC) indicator.

13. A method as in claim 11, wherein the first type of received signal is a control and supervision message type, and wherein the second type of received signal conveys data generated by a user or intended for a user.

14. A method as in claim 11, wherein the first type of received signal is a Fast Associated Control Channel (FACCH) type, and wherein the second type of received signal is one of a DATA type or an encoded speech type.

15. A method as in claim 11, wherein the device is one of a mobile station or a base station.

16. A method for operating a wireless device, comprising steps of:

(A) receiving a signal and decoding the received signal using a first predetermined decoding technique to generate a first received signal quality indication and a second received signal quality indication;

(B) decoding the received signal using a second predetermined decoding technique to generate a third received signal quality indication;

(C) determining if the second received signal quality indication indicates one of a pass/fail condition;

(D) if a pass condition is indicated, comparing the first received signal quality indication to a threshold value; and (E) if the first received signal quality indication is better than the threshold value, declaring the received signal to be a first type of received signal; else (F) determining if the third received signal quality indication indicates one of a pass/fail condition;

(G) if (a) a pass condition is not indicated at Step D, or (b) the first received signal quality indication is found to not be better than the threshold value at Step E); and if a pass condition is indicated at Step F, declaring the received signal to be a second type of received signal; else (H) if a fail condition is indicated at Step F, declaring the received signal to be invalid.

17. A method as in claim 16, wherein the first received signal quality indication is a Bit Error Rate (BER), and wherein the second and third received signal quality indications are each a Cyclic Redundancy Check (CRC) indicator.

18. A method as in claim 16, wherein the first type of received signal is a control and supervision message type, and wherein the second type of received signal conveys data generated by a user or intended for a user.

19. A method as in claim 16, wherein the first type of received signal is a Fast Associated Control Channel (FACCH) type, and wherein the second type of received signal is one of a DATA type or an encoded speech type.

20. A method as in claim 16, wherein the device is one of a mobile station or a base station.

21. A method for operating a wireless device, comprising steps of:

(A) receiving a signal and decoding the received signal using a first predetermined decoding technique to generate a first received signal quality indication and a second received signal quality indication;

(B) decoding the received signal using a second predetermined decoding technique to generate a third received signal quality indication and a fourth received signal quality indication;

(C) determining if the second received signal quality indication indicates one of a pass/fail condition;

(D) if a pass condition is indicated, comparing the first received signal quality indication to a threshold value; and (E) if the first received signal quality indication is worse than the threshold value;

(F) determining if the fourth received signal quality indication indicates one of a pass/fail condition;
  if a pass condition is indicated, comparing the first received signal quality indication to the third received signal quality indication; and (G) if the first received signal quality indication is not worse than the third received signal quality indication, or if the first received signal quality indication is not worse than the threshold value in Step E, or if the fourth received signal quality indication indicates a fail condition in Step F, then declaring the received signal to be a first type of received signal;

(H) decoding the received signal using the second predetermined decoding technique to generate the third received signal quality indication and the fourth received signal quality indication;

(I) determining if the fourth received signal quality indication indicates one of the pass/fail condition;

(J)
  (a) if a pass condition is not indicated at Step C; and
  (b) if a pass condition is indicated at Step I, or if the first received signal quality indication is determined to be worse than the third received signal quality indication at Step F;
  (c) declaring the received signal to be a second type of received signal; else (K) if a fail condition is indicated at Step I, declaring the received signal to be invalid.

22. A method as in claim 21, wherein the first and third received signal quality indications are each a Bit Error Rate (BER), and wherein the second and fourth received signal quality indications are each a Cyclic Redundancy Check (CRC) indicator.

23. A method as in claim 21, wherein the first type of received signal is a control and supervision message type, and wherein the second type of received signal conveys data generated by a user or intended for a user.

24. A method as in claim 21, wherein the first type of received signal is a Fast Associated Control Channel (FACCH) type, and wherein the second type of received signal is one of a DATA type or an encoded speech type.

25. A method as in claim 21, wherein the device is one of a mobile station or a base station.

26. A method for operating a wireless device, comprising steps of:

(A) receiving a signal and decoding the received signal using a first predetermined decoding technique to generate decoded data and a first received signal quality indication;

(B) decoding the received signal using a second predetermined decoding technique to generate a second received signal quality indication;

(C) determining if the first received signal quality indication indicates one of a pass/fail condition;

(D) if a pass condition is indicated, checking the decoded data to determine if it contains a valid data type;

(E) if the decoded data contains a valid data type, declaring the received signal to be a first type of received signal;

(F) determining if the second received signal quality indication indicates one of a pass/fail condition;

(G)
- (a) if the first received signal quality indication indicates a fail condition at Step C, or if the checking of the decoded data does not find that it contains a valid data type; and
  if a pass condition is indicated in step F, declaring the received signal to be a second type of received signal; else (H) if a fail condition is indicated, declaring the received signal to be invalid.

27. A method as in claim 26, wherein the first and the second received signal quality indications are each a Cyclic Redundancy Check (CRC) indicator.

28. A method as in claim 26, wherein the first type of received signal is a control and supervision message type, and wherein the second type of received signal conveys data generated by a user or intended for a user.

29. A method as in claim 26, wherein the first type of received signal is a Fast Associated Control Channel (FACCH) type, and wherein the second type of received signal is one of a DATA type or an encoded speech type.

30. A method as in claim 26, wherein the device is one of a mobile station or a base station.

31. A wireless device, comprising a wireless receiver coupled to a controller having a memory and at least one received signal decoder for:

(A) receiving a signal and decoding the received signal using a first predetermined decoding technique to generate a first received signal quality indication and a second received signal quality indication;

(B) decoding the received signal using a second predetermined decoding technique to generate a third received signal quality indication;

(C) determining if the second received signal quality indication indicates one of a pass/fail condition;

(D) if a pass condition is indicated, comparing the first received signal quality indication to a threshold value; and (E) if the first received signal quality indication is better than the threshold value, declaring the received signal to be a first type of received signal; else (F) if a pass condition is not indicated at Step D, or if the first received signal quality indication is found to not be better than the threshold value at Step E;

(G) determining if the third received signal quality indication indicates one of a pass/fail condition;

(H) if a pass condition is indicated at Step G, declaring the received signal to be a second type of received signal; else (I) if a fail condition is indicated at Step G, declaring the received signal to be invalid.

32. A wireless device according to claim 31, in which:
said device is a mobile station.

33. A wireless device according to claim 31, in which:
said first predetermined decoding technique is adapted for control signals to generate and store a control signal quality indication and to decode the received signal using a second predetermined decoding technique adapted for data signals to generate and store a data signal quality indication.

\* \* \* \* \*